United States Patent [19]

Smith

[11] Patent Number: 5,113,070
[45] Date of Patent: May 12, 1992

[54] TEMPERATURE COMPENSATOR FOR AN OPTIC FIBER PRESSURE TRANSDUCER

[75] Inventor: John Douglas Smith, Houston, Tex.

[73] Assignee: ABB Vetco Gray Inc., Houston, Tex.

[21] Appl. No.: 677,714

[22] Filed: Mar. 29, 1991

[51] Int. Cl.⁵ .......................... H01J 5/16; H01J 40/14
[52] U.S. Cl. ............................................... 250/227.21
[58] Field of Search .................... 250/227.21, 227.23, 250/231.1

[56] References Cited

U.S. PATENT DOCUMENTS

| | | |
|---|---|---|
| 4,160,600 | 7/1979 | Luke . |
| 4,193,130 | 3/1980 | Young et al. . |
| 4,387,600 | 6/1983 | Kranz . |
| 4,627,728 | 12/1986 | Wilson . |
| 4,678,909 | 7/1987 | Jackson et al. . |
| 4,722,603 | 2/1988 | Graebner et al. . |
| 4,766,306 | 8/1988 | Bichsel et al. ................. 250/227.21 |
| 4,803,479 | 2/1989 | Gaebner et al. . |
| 4,859,844 | 8/1989 | Herman et al. . |
| 4,862,424 | 8/1989 | Graebner et al. . |
| 4,873,989 | 10/1989 | Einzig . |
| 4,904,863 | 2/1990 | McDearmon . |
| 4,932,263 | 6/1990 | Wlodarczyk .................... 250/227.23 |
| 5,031,987 | 7/1991 | Norling .......................... 250/227.21 |

Primary Examiner—Bruce C. Anderson
Attorney, Agent, or Firm—James E. Bradley

[57] ABSTRACT

An interferometer for measuring pressure using optic fibers has a temperature compensating device. The instrument has an optic fiber sensing leg and an optic fiber reference leg, both of which are clamped in tension. An elongated reference compensating member extends parallel to the reference leg. A similar sensing compensating member compensates parallel to the sensing leg. The compensating members will apply selected tension. The compensating members are expansible in response to temperature change. The lengths of the compensating members can be changed, as well.

17 Claims, 1 Drawing Sheet

TEMPERATURE COMPENSATOR FOR AN OPTIC FIBER PRESSURE TRANSDUCER

BACKGROUND OF THE INVENTION

1. Field of the invention

This invention relates in general to monitoring pressure remotely, and in particular to an optic fiber pressure transducer having reference and sensing legs and a temperature compensating device for compensating for temperature changes.

2. Description of the Prior Art

There are instances where remote sensing of pressure is a difficult task. For example, in oil, gas or steam wells a typical pressure sensor will mount within the well. Electrical lines will supply power to the sensor to monitor the pressure. Having active electronics in a well environment can be a problem. High temperatures in the well can affect the electronics adversely. Immersion of the electrical cable in the well environment, which is harsh, can cause cable failure.

U.S. Pat. No. 4,859,844 describes a pressure sensing system that utilizes an optical interferometer. The system in the patent employs fiber optics. Light is transmitted through optic fibers. The light splits at an optical coupler/splitter into two legs. One leg is used as a reference. The other optic fiber leg has one end connected to a bourdon tube or other type of pressure transducer.

A difference in pressure sensed by the pressure transducer will cause a change in length of the sensing leg. The light passing through the sensing and reference legs reflects back to the splitter. If the length in the sensing leg changes as a result of pressure change, then the light path length travelled in each leg will not precisely match. This difference can be processed by conventional equipment. The differences can be correlated into the pressure sensed.

The temperature in a downhole well will be elevated. If the temperature changes, both the reference leg and the sensing leg will experience a change in length due to the temperature change. The bourdon tube will also experience a change in length due to temperature effect. The temperature effect could be misread as a pressure change.

SUMMARY OF THE INVENTION

In this invention, an elongated reference compensating member is mounted parallel to the reference leg to apply tension to the reference leg and vary the length of the reference leg. Similarly, an elongated sensing compensated member will be mounted parallel to the sensing leg. The compensating members will each have a coefficient of temperature expansion. Also, the compensating members can be adjusted so that they will selectively vary the lengths of the legs.

Preferably, each compensating member is made of multiple parts, which could each have different coefficients of thermal expansion. Therefore, not only will changing the length of the entire member affect temperature compensation, but the length of each multiple part with respect to the overall length could be adjusted to contribute more or less expansion, due to its individual coefficient of thermal expansion and respective length, to the overall net expansion.

The assembly will be placed in an oven to apply heat to a temperature expected in the well. Pressure will be monitored as the assembly heats. The pressure should be constant during the heating process. If the pressure changes, this indicates that temperature is causing an erroneous reading. The compensating members can be adjusted manually to minimize this erroneous reading.

DETAILED DESCRIPTION OF THE INVENTION

Figure 1:
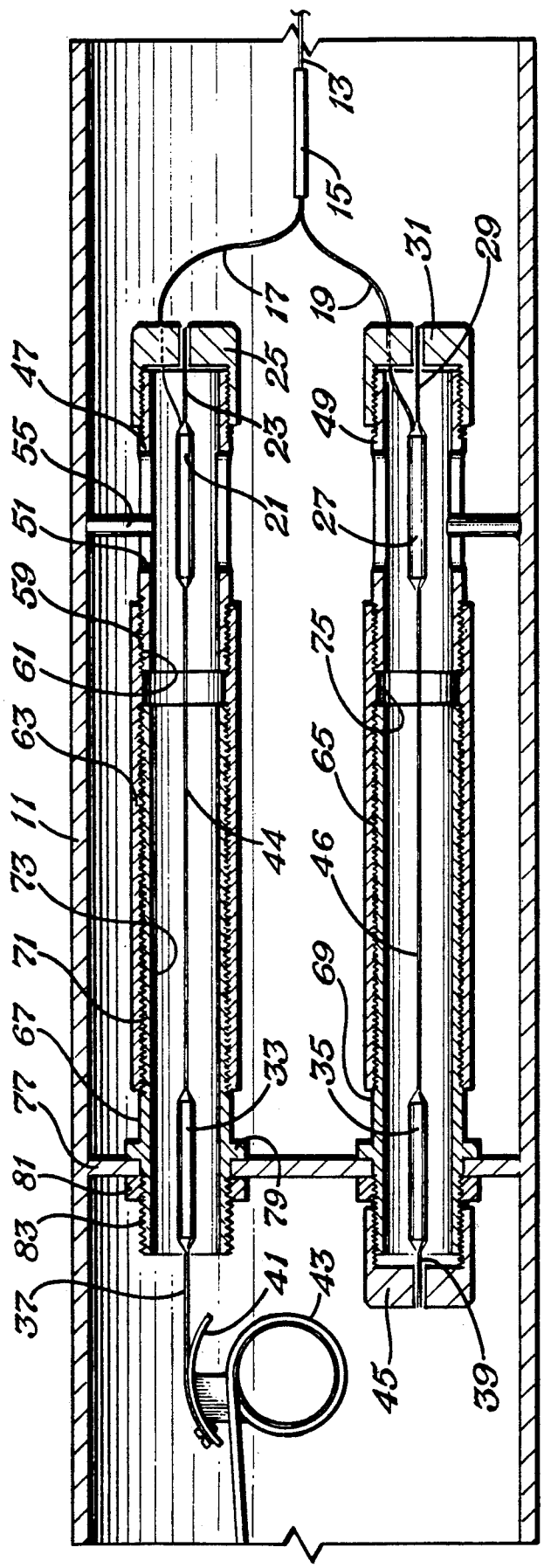
FIG. 1 is the sole figure and it is a simplified, sectional view illustrating the downhole portion of a pressure sensing instrument constructed in accordance with this invention.

Housing 11 will be located in the well. An optic fiber 13 extends from surface monitoring equipment to housing 11. Optic fiber 13 enters a coupler/splitter 15 which is a known component. Coupler/splitter 15 splits the light beam into two optic fibers 17, 19. The beam will pass through the fibers 17, 19 to the ends of the fibers 17, 19, which are mirrored to reflect the beams back to the coupler/splitter 15.

If one of the fibers 17, 19 changes in length relative to the other of the fibers 17, 19, then the wavelengths of the light coming back to the coupler/splitter 15 will be out of phase. Conventional processing equipment, such as described in U.S. Pat. No. 4,859,844 may be used to process this difference in phase to determine the pressure being monitored.

The forward end of the sensing fiber 17 is connected by a clamp 21 to a wire 23. Wire 23 extends to a cap 25. Cap 25 will clamp the end of wire 23. Preferably, cap 25 is of two parts that can be bolted together to clamp the wire 23 by compression. The details are not shown, and may be varied. Similarly, the reference fiber 19 connects by clamp 27 to a wire 29. Wire 29 is clamped firmly by a cap 31.

The sensing fiber 17 extends from clamp 21 to a rearward clamp 33. Similarly, the reference fiber 19 extends rearward from clamp 27 to a rearward clamp 35. Clamps 33, 35 clamp the optic fibers 17, 19 to wires 37, 39.

Wire 37 leads to the arm 41 of a bourdon tube 43. Bourdon tube 43 has one end exposed to well fluid so that it will receive well fluid under pressure. Pressure changes will cause the arm 41 to rotate slightly in forward and rearward directions. As it rotates in one direction, it will increase tension on the sensing leg 44 of sensing fiber 17. Sensing leg 44 is the portion of sensing fiber 17 from the clamp 21 to the clamp 33. The tension is sufficiently high to cause slight stretching of the sensing leg 44 within elastic limits.

The wire 39 of the reference fiber 19 leads to a cap 45. Cap 45 clamps the wire 39 rigidly. A reference leg 46 will be defined by the portion of the reference fiber 19 between the clamps 27, 35.

Cap 25 is secured by threads to the forward end of a forward tube 47. Forward tube 47 coaxially receives the sensing leg 44. Similarly, cap 31 secures to a forward tube 49. Forward tube 49 concentrically receives the reference leg 46. Each of the forward tubes 47, 49 has a slot 51. Slot 51 is elongated and receives a pin 55. Each pin 55 extends radially inward from the sidewall of housing 11 into one of the slots 51. The pins 55 prevent the forward tubes 47, 49 from rotating relative to housing 11.

Each of the forward tubes 47, 49 also has threads 59 externally formed on the rearward ends. A sleeve 63 has threads 61 that secure to the threads 59 of the sensing forward tube 47. Similarly, sleeve 65 has threads 61 for securing to the threads 59 of the reference forward tube 49.

A rearward tube 67 secures to sleeve 63, and a rearward tube 69 secures to sleeve 65. Both rearward tubes 67, 69 have threads 71 for engaging a set of threads 73 formed in each sleeve 63, 65. The threads 73 are of a slightly different pitch than the threads 61. Threads 73 and 61 are separated by a gap 75. The pitch of the threads 73 is preferably coarser, about 40 threads per inch. The pitch of the threads 61 is preferably 42 threads per inch.

The rearward tubes 67, 69 mount to brackets 77, which although shown schematically to be one, would likely be two separate brackets in actuality. Brackets 77 are rigidly mounted to the housing 11. Each rearward tube 67, 69 has a shoulder 79 that abuts against the forward side of bracket 77. Each rearward tube 67 extends through a hole in bracket 77. A nut 81 will engage threads 83 on each rearward tube 67, 69. Nuts 81, when tightened, will rigidly lock the rearward tubes 67, 69 to the brackets 77. The cap 45 secures to the threads 83 of the reference rearward tube 69.

To calibrate the instrument, preferably the downhole temperature to within about 10 degrees will be known. The instrument will be assembled as shown in FIG. 1, with an initial tension applied to the legs 44, 46. Leg 44 will be sized slightly greater than leg 46, preferably about 0.0015 inch. The processor signals will be watched while tension is applied.

Tension will be applied first by rotating rearward tubes 67, 69 relative to the sleeves 63, 65. A tool will be used to hold sleeves 63, 65 stationary. Nuts 81 will be loosened for this rotation. For each revolution of one of the tubes 67, 69, the length of the legs 44, 46 will change by 1/40th of an inch. Once the approximate tension has been reached, nuts 81 are tightened to prevent the rearward tubes 67, 69 from rotating.

Then, fine adjustments are made. The fine adjustments are made by rotating the sleeves 63, 65 relative to the tubes 67, 69. Rotation of the sleeves 63, 65, in one direction will cause forward movement of the forward tubes 47, 49 relative to the sleeves 63, 65. Similarly, the same rotation in the same direction will cause the sleeves 63, 65 to move rearward relative to the rearward tubes 67, 69, which will not move axially. The difference in the thread pitch will cause a slight net axial movement of the forward tubes 47, 49 relative to the rearward tubes 67, 69. For each rotation of the sleeves 63, 65 in one direction, the legs 44, 46 will lengthen by 1/840th of an inch. The processor will monitor the signals until a proper pressure reading has been achieved.

Then, the assembly will be placed in an oven to heat it to the selected temperature. The pressure should remain constant, normally atmospheric. If the pressure changes, this indicates that the bourdon tube or other mechanical mounting is erroneously affecting the pressure indication due to temperature change. The operator will adjust one or more of the sleeves 63, 65 to change the lengths of the legs 44, 46. Eventually, the thermally induced pressure change can be nullified. The instrument will then be thermally compensated.

The coefficient of temperature expansion of the various tubes 47, 49, 67, 69 and sleeves 61, 63 can be the same or can be different. These coefficients of temperature expansion cause expansion of the tubes and a stretching or application of tension to the legs 44, 46 upon the application of heat.

Also, the direction of polarization of the light in the two legs 44, 46 can be set with the assembly. Rotating the caps 25, 31 and 45 will apply torque, which is transmitted to the fibers 44, 46. This rotation or torque allows for alignment of the polarization individually in each leg so that maximum interference is achieved at the coupler/splitter 15.

The invention has significant advantages. The temperature compensating tubes allow the instrument to be precisely calibrated so the temperature does not affect the pressure reading. The telescoping tube assemblies allow precise arrangement of the lengths of the legs. The telescoping tubes will also allow proper polarization.

While the invention has been shown in only one of its forms, it should be apparent to those skilled in the art that it is not so limited, but is susceptible to various changes without departing from the scope of the invention.

I claim:

1. In an instrument for measuring pressure of a type having a pair of optic fibers located in the housing, one of the optic fibers being a sensing leg and the other of the optic fibers being a reference leg, the sensing leg being connected to a pressure transducer for changing the length of the leg in response to pressure changes, each leg having a reflective end and being connected on an opposite end to an optical coupler/splitter for receiving and reflecting back light which is processed to determine the pressure sensed, the improvement comprising in combination:

means including an elongated reference compensating member extending parallel to the reference leg for applying selected tension to and selectively varying the length of the reference leg;

means including an elongated sensing compensating member extending parallel to the sensing leg for applying selected tension to and selectively varying the length of the sensing leg; and the reference and sensing compensating members being expansible in response to temperature change to change said lengths of the reference and sensing legs, respectively, in response to temperature change, to nullify the effect of movement of the pressure transducer in response to temperature changes.

2. The instrument according to claim 1 wherein the reference compensating member and the sensing compensating member are telescopingly adjustable in length.

3. The instrument according to claim 1 wherein the reference compensating member and the sensing compensating member are tubes, the reference compensating member coaxially receiving the reference leg and the sensing compensating member coaxially receiving the sensing leg.

4. The instrument according to claim 1 wherein the reference compensating member and the sensing compensating member are telescoping tubes which are adjustable in length, the reference compensating member coaxially receiving the reference leg and the sensing compensating member coaxially receiving the sensing leg.

5. In an instrument for measuring pressure of a type having a housing, a pair of optic fibers located in the housing, one of the optic fibers being a sensing leg and the other of the optic fibers being a reference leg, the sensing leg being connected to a pressure transducer for changing the length of the leg in response to pressure changes, each leg having a reflective end and being connected on an opposite end to an optical coupler/splitter for receiving and reflecting back light which is processed to determine the pressure sensed, the improvement comprising in combination:

forward and rearward reference support means spaced apart from each other in the housing for holding the reference leg in tension;

a forward sensing support means in the housing for holding tension on the sensing leg, the rearward end of the sensing leg being held by the pressure transducer;

means including an elongated reference compensating member extending parallel to the reference leg and connected to at least one of the reference support means for selectively varying the distance between the forward and rearward reference support means;

means including an elongated sensing compensating member extending parallel to the sensing leg and connected to the forward sensing support means, for selectively varying the distance from the forward sensing support means to the rearward end of the sensing leg; and the reference and sensing compensating members being expansible in response to temperature change to change said distances in response to temperature change, to nullify the effect of movement of the pressure transducer in response to temperature changes.

6. The instrument according to claim 5 wherein the reference compensating member and the sensing compensating member are telescopingly adjustable in length.

7. The instrument according to claim 5 wherein the reference compensating member and the sensing compensating member are tubes, the reference compensating member coaxially receiving the reference leg and the sensing compensating member coaxially receiving the sensing leg.

8. The instrument according to claim 5 wherein the reference compensating member and the sensing compensating member are telescoping tubes which are adjustable in length, the reference compensating member coaxially receiving the reference leg and the sensing compensating member coaxially receiving the sensing leg.

9. The instrument according to claim 5 wherein the reference compensating member comprises:

a rearward reference tube connected to the rearward reference support means, the rearward reference tube having threads on a forward end and coaxially receiving the reference leg;

a forward reference tube connected to the forward reference support means, the forward reference tube having threads on a rearward end and coaxially receiving the reference leg; and a reference sleeve coaxially receiving the reference leg and threadingly engaging the threads of the forward and rearward reference tubes, so that rotating the reference sleeve relative to the forward and rearward reference tubes changes the length of the reference compensating member.

10. The instrument according to claim 9 wherein the threads of the rearward reference tube are of a different pitch than the threads of the forward tube, so that one rotation of one of the tubes relative to the other tube and to the sleeve changes the length of the reference compensating member by a different amount than one rotation of the sleeve relative to both of the tubes.

11. The instrument according to claim 5 wherein the sensing compensating member comprises:

a rearward sensing tube supported by the housing, the rearward sensing tube having threads on a forward end and coaxially receiving the sensing leg;

a forward sensing tube connected to the forward sensing support means, the forward sensing tube having threads on a rearward end and coaxially receiving the sensing leg; and a sensing sleeve coaxially receiving the sensing leg and threadingly engaging the threads of the forward and rearward sensing tubes, so that rotating the sensing sleeve relative to the forward and rearward sensing tubes changes the length of the sensing compensating member.

12. The instrument according to claim 11 wherein the threads of the rearward sensing tube are of a different pitch than the threads of the forward tube, so that one rotation of one of the tubes relative to the other tube and to the sleeve changes the length of the sensing compensating member by a different amount than one rotation of the sleeve relative to both of the tubes.

13. In an instrument for measuring pressure of a type having a housing, a pair of optic fibers located in the housing, one of the optic fibers being a sensing leg and the other of the optic fibers being a reference leg, the sensing leg being connected to a pressure transducer for changing the length of the leg in response to pressure changes, each leg having a reflective end and being connected on an opposite end to an optical coupler/splitter for receiving and reflecting back light which is processed to determine the pressure sensed, the improvement comprising in combination:

a telescopingly adjustable reference tube coaxially receiving the reference leg;

a telescopingly adjustable sensing tube having threads on a forward end and coaxially receiving the sensing leg;

bracket means for supporting the reference and sensing tubes in the housing; and the reference and sensing tubes being expansible in response to temperature change to change the lengths of the reference and sensing legs in response to temperature change, to nullify the effect of movement of the pressure transducer in response to temperature changes.

14. In an instrument for measuring pressure of a type having a housing, a pair of optic fibers located in the housing, one of the optic fibers being a sensing leg and the other of the optic fibers being a reference leg, the sensing leg being connected to a pressure transducer for changing the length of the leg in response to pressure changes, each leg having a reflective end and being connected on an opposite end to an optical coupler/splitter for receiving and reflecting back light which is processed to determine the pressure sensed, the improvement comprising in combination:

a rearward reference tube having threads on a forward end and coaxially receiving the reference leg;

a forward reference tube having threads on a rearward end and coaxially receiving the reference leg;

a reference sleeve coaxially receiving the reference leg and threadingly engaging the threads of the forward and rearward reference tubes;

the threads on the forward and rearward reference tubes being of different pitch so that rotating the reference sleeve relative to the forward and rearward reference tubes changes the length of the reference compensating member;

bracket means for supporting the forward and rearward reference tubes in the housing;

a rearward sensing tube having threads on a forward end and coaxially receiving the sensing leg;

a forward sensing tube having threads on a rearward end and coaxially receiving the sensing leg;

a sensing sleeve coaxially receiving the sensing leg and threadingly engaging the threads of the forward and rearward sensing tubes;

the threads on the forward and rearward sensing tubes being of different pitch so that rotating the sensing sleeve relative to the forward and rearward sensing tubes changes the length of the sensing compensating member;

bracket means for supporting the forward and rearward sensing tubes in the housing; and the reference and sensing forward and rearward tubes being expansible in response to temperature change, to change the lengths of the reference and sensing legs in response to temperature change, to nullify the effect of movement of the pressure transducer in response to temperature changes.

15. The instrument according to claim 14 wherein one of the reference tubes is rotatable relative to the housing and the other of the reference tubes is stationary relative to the housing, so that one of the reference tubes may be rotated relative to the reference sleeve to change the length of the reference leg at a different rate than the rate of change due to rotation of the reference sleeve relative to the reference tubes.

16. The instrument according to claim 14 wherein one of the sensing tubes is rotatable relative to the housing and the other of the sensing tubes is stationary relative to the housing, so that one of the sensing tubes may be rotated relative to the sensing sleeve to change the length of the sensing leg at a different rate than the rate of change due to rotation of the sensing sleeve relative to the sensing tubes.

17. In a method for measuring pressure wherein light is passed through an optical coupler/splitter into a sensing leg optic fiber connected to a pressure transducer which changes the length of the sensing leg in response to pressure changes, and wherein light is passed simultaneously through a reference leg optic fiber, the light reflecting from an end of each leg and passing back through the optical coupler/splitter for processing to determine the pressure sensed, the improvement comprising in combination:

mounting parallel to the reference leg an adjustable elongated reference compensating member which is expansible in response to temperature change and applying a selected tension to the reference leg with the reference compensating member;

mounting parallel to the sensing leg an adjustable elongated sensing compensating member which is expansible in response to temperature change and applying a selected tension to the sensing leg with the sensing compensating member;

heating the pressure transducer, reference leg, sensing leg, reference compensating member and sensing compensating member while holding the pressure on the pressure transducer constant and monitoring the pressure sensed to determine if the pressure sensed remains constant; then changing the length of at least one of the reference and sensing legs by adjusting at least one of the reference and sensing compensating members until the pressure sensed remains substantially constant, to nullify the effect of movement of the pressure transducer in response to temperature changes.

* * * * *